US012776907B2

(12) United States Patent
Doney

(10) Patent No.: US 12,776,907 B2
(45) Date of Patent: Oct. 27, 2026

(54) METHOD AND APPARATUS FOR DECENTRALIZED MANAGEMENT OF TRUSTED DATA ON TRUSTLESS NETWORKS

(71) Applicant: SECURRENCY, INC., Durham, NC (US)

(72) Inventor: George Daniel Doney, Riva, MD (US)

(73) Assignee: DTCC DIGITAL (US) INC., Jersey City, NJ (US)

( * ) Notice: Subject to any disclaimer, the term of this patent is extended or adjusted under 35 U.S.C. 154(b) by 504 days.

(21) Appl. No.: 17/677,657

(22) Filed: Feb. 22, 2022

(65) Prior Publication Data

US 2022/0271936 A1 Aug. 25, 2022

Related U.S. Application Data

(60) Provisional application No. 63/151,840, filed on Feb. 22, 2021.

(51) Int. Cl.

| | |
|---|---|
| ***H04L 9/32*** | (2006.01) |
| ***G06F 16/21*** | (2019.01) |
| ***G06F 16/27*** | (2019.01) |
| ***H04L 9/00*** | (2022.01) |
| ***H04L 9/08*** | (2006.01) |

(52) U.S. Cl.

CPC .......... *H04L 9/3213* (2013.01); *G06F 16/211* (2019.01); *G06F 16/27* (2019.01); *H04L 9/0825* (2013.01); *H04L 9/50* (2022.05)

(58) Field of Classification Search

CPC ....... H04L 9/3213; H04L 9/0825; H04L 9/50; G06F 16/27; G06F 16/211

See application file for complete search history.

(56) References Cited

U.S. PATENT DOCUMENTS

| | | | | |
|---|---|---|---|---|
| 6,397,203 | B1 | 5/2002 | Hembry | |
| 10,373,158 | B1 * | 8/2019 | James | G06Q 40/04 |
| 10,476,847 | B1 | 11/2019 | Smith et al. | |

(Continued)

FOREIGN PATENT DOCUMENTS

| | | | | |
|---|---|---|---|---|
| WO | WO-2019067603 A1 * | 4/2019 | | G06Q 30/018 |
| WO | 2019/156705 A1 | 8/2019 | | |
| WO | WO-2020055904 A9 * | 5/2020 | | G06F 16/2379 |

OTHER PUBLICATIONS

PCT/US2022/017315; International Search Report and Written Opinion dated May 24, 2022.

*Primary Examiner* — Davida Lee King
(74) *Attorney, Agent, or Firm* — Neo IP

(57) ABSTRACT

A framework for managing data on a decentralized network is disclosed. The framework is designed to manage two conflicting forces, openness and control, in order to provide scalable trust on trustless networks. To manage this conflict, a flexible, decentralized governance model is disclosed to enable any DLT user to create and manage data contexts, a virtual boundary for controlling data rights, meaning, and value so as to produce accountable, trusted data with full provenance. The framework does not need to determine who should be trusted, how the trust network forms, or how meaning is developed while providing a governance model by which any authorized user can contribute meaning (properties) and monetize attributable data (attestations).

17 Claims, 4 Drawing Sheets

(56) References Cited

U.S. PATENT DOCUMENTS

| | | | |
|---|---|---|---|
| 10,484,255 | B2 | 11/2019 | Di Pietro et al. |
| 10,489,597 | B2 | 11/2019 | Safford et al. |
| 10,528,890 | B1 * | 1/2020 | Boston .................. G06F 16/125 |
| 10,673,626 | B2 | 6/2020 | Sandberg-Maitland et al. |
| 10,735,202 | B2 | 8/2020 | Jayachandran et al. |
| 11,159,307 | B2 | 10/2021 | Bathen et al. |
| 11,250,423 | B2 | 2/2022 | Heyner |
| 11,250,466 | B2 | 2/2022 | Soundararajan et al. |
| 11,398,911 | B1 * | 7/2022 | Gunning ............. G07F 17/0014 |
| 12,155,750 | B2 | 11/2024 | Everspaugh et al. |
| 12,160,521 | B2 | 12/2024 | Tothill et al. |
| 12,217,245 | B2 | 2/2025 | Moy et al. |
| 12,261,852 | B2 | 3/2025 | Oberhauser et al. |
| 12,309,257 | B2 | 5/2025 | Covaci et al. |
| 2019/0158275 | A1 * | 5/2019 | Beck .................. G06Q 20/0658 |
| 2019/0229918 | A1 | 7/2019 | Naqvi et al. |
| 2019/0312875 | A1 | 10/2019 | Sardesai et al. |
| 2020/0034876 | A1 | 1/2020 | Soundararajan et al. |
| 2020/0219150 | A1 * | 7/2020 | Johnston ............ G06Q 30/0282 |
| 2020/0344233 | A1 * | 10/2020 | Lai ..................... G06Q 20/4014 |
| 2021/0027196 | A1 | 1/2021 | Boston et al. |
| 2021/0042836 | A1 | 2/2021 | Doney et al. |
| 2021/0090076 | A1 | 3/2021 | Wright et al. |
| 2021/0091959 | A1 | 3/2021 | Chen et al. |
| 2021/0377263 | A1 | 12/2021 | Law |
| 2022/0051261 | A1 | 2/2022 | Vetas |
| 2024/0185229 | A1 | 6/2024 | Dashkov |
| 2025/0061449 | A1 | 2/2025 | Grube et al. |
| 2025/0104049 | A1 | 3/2025 | Moy et al. |
| 2025/0173721 | A1 | 5/2025 | Wu et al. |

* cited by examiner

METHOD AND APPARATUS FOR DECENTRALIZED MANAGEMENT OF TRUSTED DATA ON TRUSTLESS NETWORKS

RELATED APPLICATION DATA

This application is a non-provisional application of provisional application Ser. No. 63/151,840, the entire disclosure of which is incorporated herein by reference.

BACKGROUND

Distributed ledger technology (DLT) is a next generation computing platform that enables the creation of digital assets that can be issued and transacted without the necessary participation of intermediaries. At its core is a distributed ledger, which is a type of distributed database that operates without a central authority and replicates an identical copy to a non-hierarchical network of nodes that communicate with each other over peer-to-peer protocols. The ledger and resulting state of the system is secured from fault by the use of consensus mechanisms that replace the trusted node or central authority used in traditional distributed databases. The ability to decentralize state change authorization decisions is a principal DLT innovation. As DLT has evolved, the shared ledger can serve as the foundation for a decentralized computing platform that provides a runtime environment for programs stored on the ledger.

The first application of DLT was to create and run an application and digital currency named "Bitcoin," which was launched in 2009. Since then, Bitcoin inspired systems have been developed to create digital representations, represented by "tokens" of fungible (e.g., currency, gold, oil) and non-fungible assets (e.g., share certificates, crypto art) that are created and transacted upon DLT platforms. An attraction of this work is that the digital ("tokenized") assets (also referred to as "objects" herein) can be exchanged simultaneously (e.g., asset for currency, also known as DvP, or currency for currency) using standardized logic (e.g., the ERC-20 fungible token standard or the ERC-721 non-fungible token standard) and without the need for reconciliation or a central authority.

"Smart contracts" are executable code stored on a distributed ledger and able to execute various functions thereby enabling versatility in DLT systems. However, as the range of applications for DLT has expanded, it has become difficult to manage rights in the various transactions accomplished on the ledger. For example, transactions of financial instruments are highly regulated by various authorities to protect market participants and thereby require a framework of data rights management.

The data demands of smart contracts gave rise to oracles, third-party services that share data from the off-chain to smart contracts. The oracle verifies and authenticates data through trusted APIs. Smart contracts can then utilize the information to make decisions.

SUMMARY OF THE INVENTION

While oracles have played an important role in trusted data usage on blockchain networks, they have not significantly decentralized the creation and sharing of data on-chain, especially individual data elements or attestations shared between untrusted smart contracts or assigned by individual or collective end-users.

An attestation is the action of being a witness to or formally certifying something. The immutable nature of distributed ledger technologies provide a favorable technology substrate to enable participants to attest, that is to post data with attribution usually about an object of interest, where data is a value with meaning. To be reliable, an attestation should have the following characteristics: assigning a statement (value) in an understandable format (dataType) about a characteristic (property) of a thing or things (identified object or objects) by a qualified party for a period of time for which the statement valid in a context (source) where the authority and meaning of the statement can be identified.

Disclosed implementations provide methods and systems to create a decentralized ecosystem of data consumers and producers (attestors) on distributed ledger networks. The attestation registry disclosed herein provides a smart contract based general purpose data management layer with flexible controls to enable a decentralized coalition of participants to: define data schema; share data; manage access and authority to create, update, and delete decentralized data; track provenance and data staleness; and mediate between differing formats for data consumption.

The smart contract of the attestation registry, referred to as AttestationRegistry herein, consists of 3 main parts: a property registry to manage data definitions; a source registry to manage data rights; and a registry for assigning property values to objects while storing attribution and expiration.

The disclosed implementations include a series of linked registries to capture and manage the principal objects that enable data configuration and data rights management. A distributed ledger registry includes a smart contract that contains a table defining the structure of the principal object of the registry with each row being a unique instance of the object. For example, the smart contract SourceRegistry described below contains a table and its related data structures with each row representing a registered data source. The registry's smart contract contains logic to create, update, delete, and manage a source of data. The various registries of the disclosed implementations are discussed in detail below.

Disclosed implementations include a method for creating a trusted data management model in a decentralized computing environment and a distributed computing system for accomplishing the method. The method comprises: creating infrastructure, by the deployment of smart contracts to a distributed ledger, the infrastructure including a data structure for capturing, indexing, and storing attestation data corresponding to an attestation, wherein an attestation is a claim about an item or a linkage between items made by at least one authorized and accountable attesting user in a data context; creating and managing a source in a source registry smart contract, by an authorized data management user signing a distributed ledger transaction, a source specifying a control context for the management of data, the data including attestation data and properties which define the attestation data, the control context defining a governance model to be applied to the corresponding data, whereby the authorized data management user can at least one of define, delegate, and/or decentralize rights to manage the data in the context, the rights being the ability for data consumption users to read or write data assigned to the control context using a distributed ledger public/private key; assigning at least one property to corresponding attestation data, by an authorized property assignment user, by signing a distributed ledger transaction, each of said at least one property including a source, a name, a data type, at least one value constraint, a unit designation, and structure to the corresponding attestation data to thereby define the attestation data; making at least one attestation, by an attestor who is one of the at least one authorized and accountable attesting users, by submitting attestation data and signing a distributed ledger transaction, the attestation data pertaining to an item or a linkage between items, wherein the item is keyed by a unique identifier of an object corresponding to the item, wherein the attestation data is assigned to at least one corresponding property defining the attestation data, the attestation data preserving an identity of the attestor, the attestation data containing a last update date and an expiration date; and consuming attestation data, by a third party smart contract or an authorized consuming user signing a distributed ledger transaction.

BRIEF DESCRIPTION OF THE DRAWINGS

The foregoing summary, as well as the following detailed description of the invention, will be better understood when read in conjunction with the appended drawings. For the purpose of illustrating the invention, there are shown in the appended drawings various illustrative embodiments. It should be understood, however, that the invention is not limited to the precise arrangements and instrumentalities shown. In the drawings.

DETAILED DESCRIPTION

Figure 1:
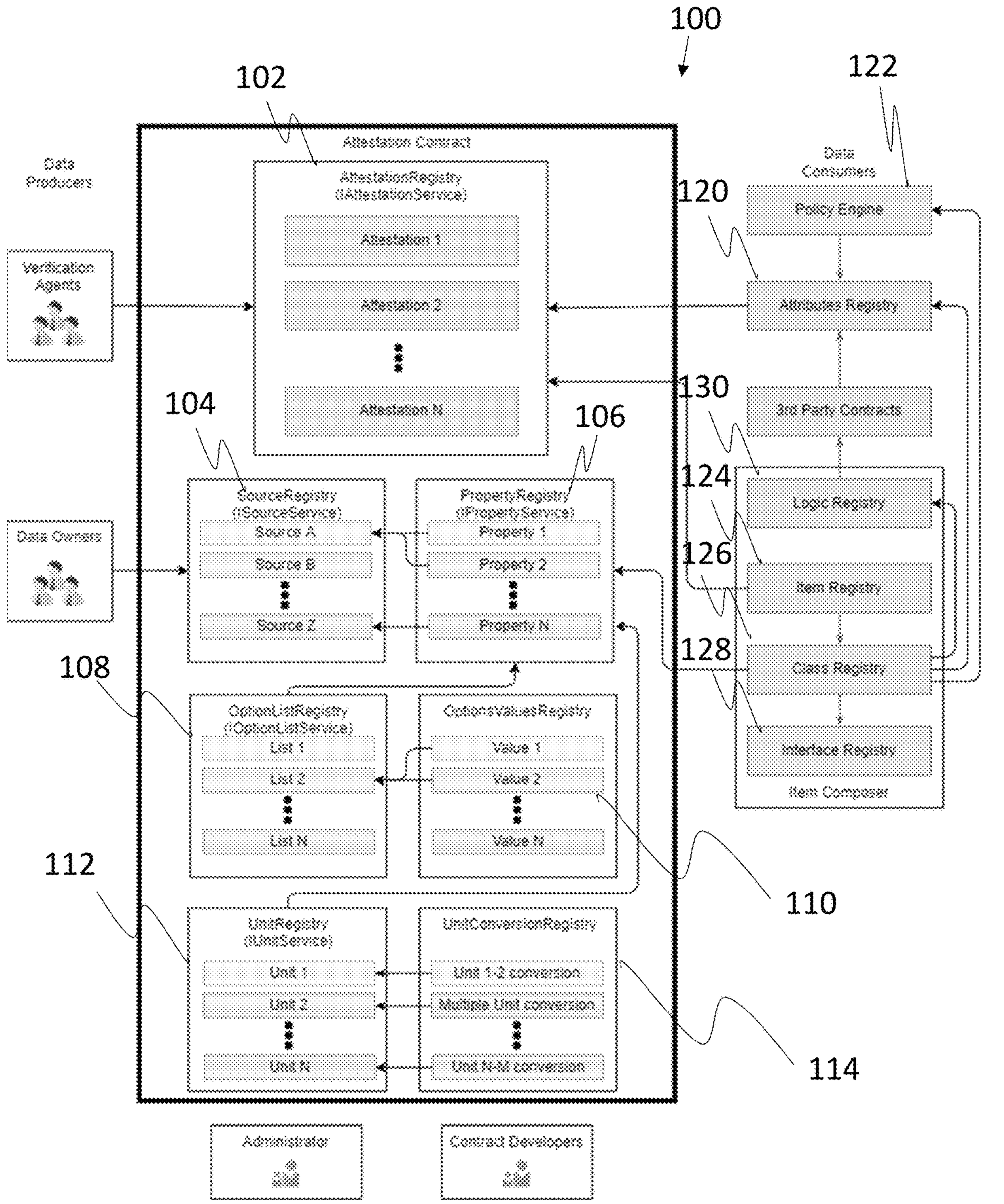
FIG. 1 is a schematic diagram of a computing architecture in accordance with disclosed embodiments.

An open flexible model for creating data contexts in order to create the conditions for reliable, trusted data on trustless distributed ledger networks is provided. The openness and immutability of distributed ledger networks provides a powerful substrate for data management. However, innovations are required to enable trustless distributed ledgers to support data management practices required for trusted data. The disclosed framework is designed to manage two conflicting forces, openness and control, in order to provide scalable trust. To manage this conflict, a data context, recorded as a source in a source registry, established a virtual boundary for controlling data rights, meaning, and value so as to produce accountable, trusted data with full provenance for authorized participants in the data context. The model is designed to be open and decentralized, making no judgment on who should be trusted, how the trust network forms, or how meaning is developed, but rather providing the means for authorized parties to establish a data context, and manage it to maintain the trust desired by the context.

Disclosed implementations provide a flexible governance model to decentralize data management by creating an open, accessible, accountable, general-purpose trusted data storage framework on a trustless distributed ledger by which any authorized user can contribute meaning (properties), and attributable data (attestations), to the network. To be reliable, an attestation should have the following characteristics: assigning data (value) in an understandable format (dataType) about a characteristic (property) of a thing or things (identified object or objects) by a qualified party for a period of time for which the statement can be validated by its context (source) such that the authority and meaning of the data can be identified.

For example, a financial institution may attest to a party's Know Your Customer (KYC) status by assigning the Boolean value "true" to the property KYC verified assigned to the party's wallet and attributable to the financial institution and valid for 1 year. Other examples, a rating agency may assign a rating "AAA" to a bond for a financial quarter or the asset manager may assign the Net Asset Value (NAV) of $40/share to a fund for the day.

But if the KYC attestation above is made by an unreliable or unknown party, or if the requirements for vetting a party to assess KYC status is not agreed or understood, or if the data is 20 years old, or if the party to whom the value is assigned is not uniquely identified, the attestation has little merit.

A source (data context) can be established by any authorized participant via a blockchain wallet, that is a public/private key pair with the means to affect a state change on the distributed ledger. The source creator has the means to define the control model for any data within the context including the ability to delegate control to other participants as required to scale the data and trust required by the context. Open data contexts are created through the use of a source registry to permit any authorized user with a blockchain address to: create a data context; define properties, that is, an informal data schema; control and delegate write and (depending on the implementation) read access. Source control types include creator controlled, roles-based access control (RBAC), and attribute-based access control (ABAC) through the use of configurable policies.

The first step in developing a trusted data context is to develop semantics, that is the meaning of data assigned to objects in the network, in the disclosed implementation meaning is maintained by end-user configurable properties. The authority to assign meaning is as important as the data itself, therefore the generation of properties must be both flexible and controllable. The disclosure enables authorized users to define properties, as described below. A property is a characteristic that can be assigned to an object thereby defining the object itself. In the disclosure, properties have a source (defining the right to define as establish values associated with a property), a name, a data type, and other parameters used to establish meaning.

In their simplest form, a property can be thought of like a column in a data table, such as Price, where each object (row in the table) can be assigned a decimal value. However, this structure which is common in relational data systems, can actually constrain meaning as the database administrator defines the columns and has centrally defines rules for the management of the data. The disclosed model is not confined by a table structure, as any authorized party can create a property and assign a value to any object in the ecosystem.

In the AttestationRegistry, data values (attestations) can be assigned to an object's properties through the object's identifier (as described below). Data indexing, that is the ability to search and retrieve value, is accomplished via blockchain identifiers for mapping data to blockchain based objects. Therefore, data can be assigned to properties and indexed by an authorized user for any blockchain object (or combination of objects) for any property. Examples of items with identifiers on distributed ledgers that can be indexed: wallets, smart contracts and fungible tokens, objects, and non-fungible tokens. For example, by assigning a value to a property linked to a wallet, where the wallet's unique verifiable public key is a proxy for its owner, the public key is an index for the assigned value providing an efficient mechanism for authorized parties to discover and use the assigned value. Similarly, as tokens are used to represent objects, values assigned to properties indexed by the token identifier (smart contract) can be discovered efficiently by authorized parties.

Multi-level key structures are provided for assigning attestation values to properties of an object or combination of objects. An attestation registry allows authorized users to create a record assigning values of properties keyed off the object's identifier. In this instance, a key is a unique identifier for an object used for indexing. For attestations that join two objects (for example, the enrollment amount of a wallet in a token offering), the value assigned to the property (enrollment amount) can have a primary key (token) and secondary key (wallet) for assignment in the attestation registry. If additional keys are desired (to join 3 or more objects), an additional key can be added to the indexing structure, or, for a more general-purpose solution, the values of the key for items 2 though n can be hashed and stored as the secondary key.

Property mapping enables dissimilar classes to share properties facilitating polymorphism (i.e., the ability to perform operations on dissimilar classes). In traditional relational databases, data is stored in tabular form with set schema for similar objects (classes). Dissimilar classes may share some data. But frequently, schema sharing cuts across multiple classes with different elements shared by a range of classes. For example, bonds and loans share an interest rate policy, bonds and equities share a price property, and US loans and equities share an identifier (CUSIP) property. This often leads to data mediation challenges in extract, transform, and load (ETL) operations as operators must decide what columns represent the same property in dissimilar tables.

To facilitate polymorphism in a decentralized network, disclosed embodiments identify properties independent of classes to thereby allow mapping of classes to properties separately. In the attestation registry structure of disclosed implementations, values can be assigned to dissimilar classes with the same property identifier, facilitating data mediation and polymorphism.

Disclosed implementations permit plugin unit representation and conversion for mediation between different smart contracts. Often, especially in a broad general purpose data storage system, data may be assigned to a property of different objects, the data having the same meaning but represented with different units. For example, the area property of an apartment could be stored by one system (US based) in square feet and another (European) in square meters. The meaning is the same, but a conversion is needed to reconcile the data. While square feet to square meters is a straight-forward conversion, in a system where end-users can create an arbitrary number of units, a mechanism to "plug-in" conversion logic is needed. Disclosed implementations include a unit registry allowing users to create new unit measures and assign them to properties. Additionally, smart contract developers can create unit conversion logic and register the logic in a unite conversion registry to facilitate automated conversions between systems.

To facilitate data sharing and encourage participants to tag objects by assigning relevant data, an economic incentive structure is provided to drive participation. The source model can include pricing data, so that contributors to the source can get paid when data is used elsewhere in the ecosystem. To accomplish this, a token is charged as a fee to data consumers paid to data providers (attestors) in the ecosystem. The fee to consumers and reward for attestors may be set at the source, property, or attestation. If a fee is set, to access the protected data, the consumer must sign a GetData transaction, paying the fee in the specified token to process the request. Attestors, may receive some or all of the imposed fee as compensation for the value of contributed data.

FIG. 1 schematically illustrates the architecture of a decentralized computing system in accordance with disclosed implementations. Each element of system 100 can be implemented as one or more "modules", i.e., functional elements including software executed on one or more computing devices. Primary elements of system 100 are described at a high level immediately below. Attestation registry 102, executes the AttestationRegistry smart contract provides an on-chain DLT data store containing attestations (i.e., assertions made by an authorized party about an object or joined objects). Source registry 104 executes the SourceRegistry contract and serves as a grouping structure for data management rights. Property registry 106 executes the PropertyRegistry smart contract and provides data definitions for properties of objects. Option list registry 108 executes the OptionsListRegistry smart contract and provides an extensible list of enumerations that a property value has constrained options. Option value registry 110 executes the OptionsValueRegistry smart contract and stores enumerated values for each listed enumeration in the OptionList. Unit registry 112 executes the UnitRegistry smart contract and provides a list of available units that can be assigned to attestations. A unit is a standard quantity used to express a physical quantity. Examples of units include meters, kilograms, US Dollars, seconds. Unit conversion registry 114 executes the UnitConversionRegistry smart contract and provides a list of registered smart contracts used to mediate (convert) data from one property to another unit context.

Attributes registry 120 executes the AttributesRegistry smart contract and provides a data map for external data stores and sources. Policy engine 122 executes the PolicyEngine smart contract and is a mechanism to make authorization decisions based on objects and their properties. Item registry 124 executes the Item Registry smart contract and provides DLT-based pointers to instances of objects. These pointers include a governance structure. Class registry 126 executes the ClassRegistry smart contract and provides a list of available class templates, a class template mapping the behaviors (properties, functions, events, interfaces) of a group of similar objects (known as a "class"). This class structure supports the well-known concept of class inheritance where a "child" class inherits attributes of a "parent" class. Interface registry 128 executes the InterfaceRegistry smart contract and provides definitions of properties and functions that support a grouping of behaviors. Interfaces support decentralized polymorphism. Logic registry 130 executes the LogicRegistry smart contract and provides a list of registered smart contracts containing behaviors that can be mapped via the class registry.

The ItemRegistry enables the creation and management of objects, an object being a unique instance of a collection of items, the collection sometimes called a class, the instance exhibiting the behaviors the class of items, the behaviors being the interfaces, functions, properties, events, errors, triggers, dependencies, user rights, inter-class relationships, and other characteristics of the class. As described later, an object, also referred to as an item, can be assigned to a class template in the class registry to exhibit the reusable behaviors of that class. Therefore, the Item Registry is a collection of items from many classes, as defined in the ClassRegistry.

In financial use cases or other implementations that involve value, objects may exhibit class behavior that extends the basic class, enabling behaviors for objects that represent value within the asset class. The objects may also include a mechanism to transfer ownership of the value and the object exhibits the behaviors (including ownership transferability) of an asset. The object can be represented by a unique token representing the object and its ownership right, in the system 100. Such a unique token is referred to as a "non-fungible token" or "NFT".

An implementation of Item Registry smart contract code may include the trusted control plane logic, session management, and permission enforcement for the system, together enabling the composability of objects. An object registered in item registry 124 is non-fungible, that is, it is a unique and distinct implementation of the behaviors of a class. Each object has a unique identifier, the item Id, that together with the smart contract address of Item Registry, uniquely identifies the object globally and immutably. In addition to other behaviors, the object can be assigned the standardized behaviors ownership and transfer, for example the functions and events exposed by the ERC-721 standard or equivalent, resulting in the object implementing the behaviors of a Non-Fungible Token (NFT).

Each object in ItemRegistry can represent a unique instance of a virtual, or digital representation of a physical item. Examples of physical items can be artwork, real estate, vehicles, or the like. Built on existing practices understood by practitioners of the art, an object provides an accurate and immutable representation of ownership and a unique reference, its itemId. This disclosure extends this practice to enable user configurable objects, where the itemId acts a pointer in the globally distributed virtual machine of a distributed ledger around which behaviors can be configured and affected securely and efficiently.

Other examples of objects whose behavior may be implemented in configurable classes within ItemRegistry include financial assets or processes including funds, companies, futures, forwards, swaps, options and other derivatives, loans, mortgages, bonds, repos, and other credit instruments, collateral and other credit enhancements, bonds, mortgages, leases, insurance policies, and any other financial instrument or process.

Additionally, item registry 124 may be used to create configurable objects for virtual items including, data, documents, cloud or other computing resources, and items that can be viewed or used in a virtual environment such as an online game or a "metaverse", i.e., a virtual-reality space in which users can interact with a computer-generated environment and other users. Each object in Item Registry may include a creator wallet that was used to initiate the creation of the object, a creation date, and a pointer to a class in class registry 126 affecting the behaviors of the object. Each class template registered in class registry 126 is a data structure defining the behaviors (properties, functions, etc.) of objects associated within the class as described below.

Normally, properties are set at the class level, with permission controls defined by the class owner. However, objects may include additional properties not defined by the associated class and created by the object owner or another party. These 3rd party properties can be created and set by any authorized user. The result is more like a tagging model than a formal data model. For example, a party may assign a property, Rating, to a bond object, the rating being assigned by that party independent of the object ownership structure and class defined properties. Such additional properties can be stored as data structures in attribute registry 120.

The ClassRegistry enables the creation and management of class templates. ClassRegistry defines data structures corresponding to all user defined classes (i.e., templates defining the behavior of objects of a class), each object in the Class Registry defining a class template. The class registry 126 enables users to create or extend existing classes without the need for generating new code, by populating a template linking to the desired class behavior implemented in existing smart contracts registered in the logic registry 130, and assigning associated properties, data rights, functions and execution rights to this logic. The class template also defines triggers for event processing.

A class template may be updated to extend and enhance the behaviors of a class or may inherit behaviors from previously defined classes in ClassRegistry. By updating or inheriting a class template, the behaviors of an existing class can be reused changing only the differences from the earlier implementation, allowing for efficient reuse of logic and minimal effort to adapt to changing requirements. An implementation of class registry 126 may include an ownership transfer behavior for class templates consistent with the ERC-721 specification (or equivalent on non-Ethereum ledgers) enabling class developers to monetize the value of configured classes and/or transfer this value to others.

The class template data structure can be self-referential. In other words, a class template can be created in the ClassRegistry which defines the behaviors of class objects, for example the method to map to properties in the AttestationRegistry. Instances of a class template, user defined classes, can be recorded and managed in the Item Registry linking to the desired behaviors defined in the ClassRegistry.

The LogicRegistry enables the registration and management of published smart contracts for use in class configuration within the system. The LogicRegistry stores ownership structure, certification status, and usage pricing data for published logic. The LogicRegistry is also used to manage versioning of smart contracts and to enable data reuse between versioned smart contracts using the External Data pattern described in detail within the disclosure. The LogicRegistry provides a "Pluggable Logic" capability to enables smart contract developers to deploy and register new behaviors for configuration in the ClassRegistry and instantiation by user configured objects.

The logic of published smart contracts can be certified by authorized certification agents through use of any combination of manual code inspection, manual testing, and automated testing thereby providing a list of vetted logic for use in class templates. To be certified, logic must, where needed for protected code, implement the session security model (described later) and publish in a standardized format the properties, functions, supported interfaces, events, errors, triggers, and dependencies that provide interaction points for users and other logical elements. Additionally, by scanning for references to third party functions and contracts, the certifier may manually or automatically create restrictions on published logic, enforced at the time of certification, to prevent routing of requests to external logic or data to prevent man in the middle attacks from published logic.

Accordingly, self-describing smart contracts can be efficiently configured and combined by class designers who reference smart contracts stored in Logic registry 106 rather than writing new code. The LogicRegistry may also store details about the smart contract's publisher, publication date, and certification status and provides interfaces to enable users to easily view classes which reference published logic.

The InterfaceRegistry enables the registration and management of published interface specifications, that is computer code that defines the format for interaction with smart contract properties, functions, events, errors, and dependencies without an explicit implementation of the behavior. An interface is defined as a syntactical format for all interactions with published logic. An interface groups functions, properties, events, and errors that are expected of logical implementation. The interface defines the 'what' part of the syntactical format and the implementing logic defines the 'how' part of the syntactical format. Interfaces are used to enhance interoperability through substitutability, a concept known in computer science as polymorphism. Polymorphism is an important aspect to enable scalability of an ecosystem of dissimilar but related objects by enabling a single implementation of logic that acts on common behaviors of dissimilar classes of objects. When interfaces are implemented, classes may substitute one implementation (smart contract) for another for behaviors represented by the interface. For example, logic that instantiates the behavior of a bond may be very different than logic than instantiated the behavior of a mortgage, but when implementing logic that operates on the interest rate of an object, a common interface permits the operation on these dissimilar objects without coding for each class.

The InterfaceRegistry serves to decentralize the deployment of interfaces enabling an ecosystem to consolidate around useful patterns without the need for central control of standards. This innovation is designed to manage the scale and complexity of pluggable logic and user defined classes. The InterfaceRegistry permits user defined interfaces, that is, it provides a mechanism by which end users can publish, register, and describe useful behaviors (functions, properties, etc) that are expected to be present across classes. The InterfaceRegistry creates the conditions by which common patterns can emerge though sharing of useful interfaces. Registered interfaces also facilitate the development of automated integration tests, that is tests that verify the proper behavior of register logic.

The InterfaceRegistry promotes interoperability between logical elements and facilitates much more complex behavior in the ecosystem by enabling elements to work with a range of objects that are dissimilar in implementation but exhibit similar characteristics with respect to certain behaviors. For example, bonds, derivatives, and equity are dissimilar in many respects but all exhibit price properties. Interfaces allow higher level processes to use this similarity to perform price operations on instances of each class. Through the use of a standardized interface, a developer may plug in a new implementation of a service to an object without modifying dependent code, such as upgrading to an oracle that provides a more accurate EUR USD conversion rate at a particular point in time.

Figure 2:
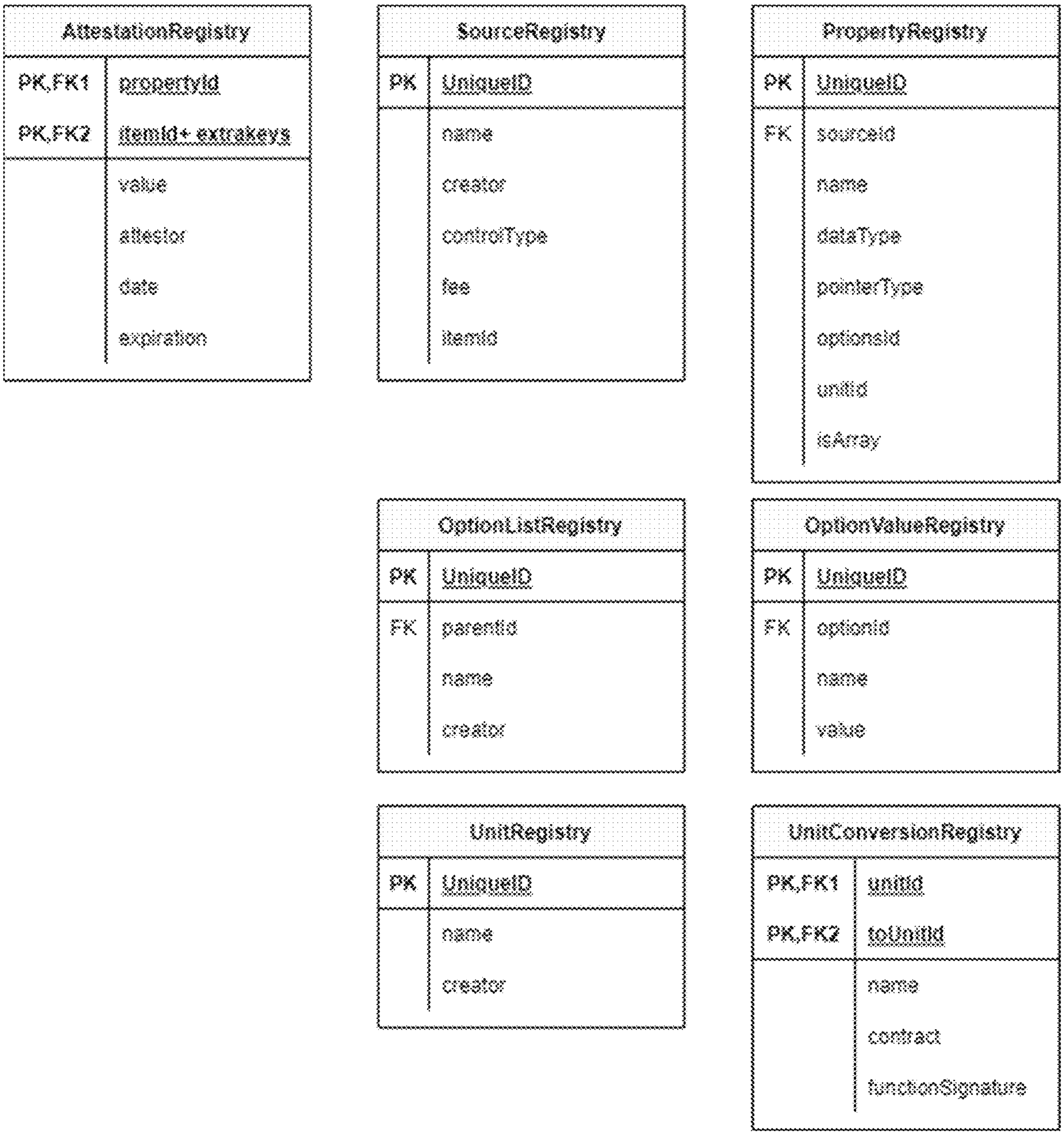
FIG. 2 is a schematic illustration of a data schema for effecting the Attestation Registry in accordance with disclosed embodiments.
Figure 3:
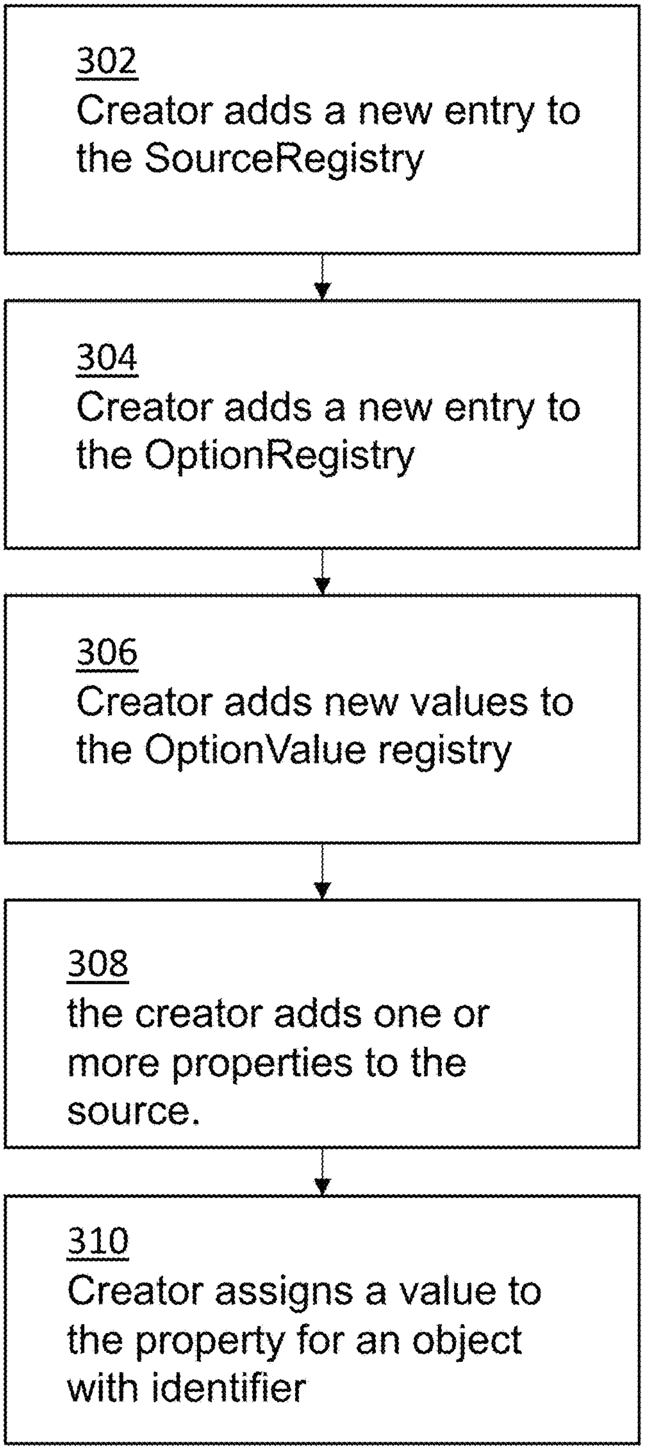
FIG. 3 is a flowchart of a process for entering data control information in accordance with disclosed embodiments.

FIG. 2 illustrates the structure of a data schema for decentralized management of data in an object-oriented system in accordance with disclosed embodiments. Each transaction is affected by signing a transaction on the blockchain ledger referencing the AttestationRegistry contract in a manner that is well-known by blockchain practitioners. FIG. 3 illustrates a process of recording the transactions in accordance with the data schema of FIG. 2.

At 302, a creator adds a new entry to the SourceRegistry, a data structure representing a governance model for one or more properties as described above. The entry can be a data structure in the form of:

Source: name="RatingAgency", creator=[Creator wallet], controlType=owner, fee=null, itemId=null At step 304, the creator adds a new entry to the Option Registry. The entry can be a data structure in the form of:

OptionList: name="Ratings", parentId=null

At 306, the creator adds new values to the OptionValue registry. The entry can be in the form of:

OptionValue: optionId=[Ratings optionId], name="AAA"

OptionValue: optionId=[Ratings optionId], name="BBB"

At 308, the creator adds one or more properties to the source. For example, the properties can be added in the form of the data structure below:

Property: name=Rating, datatype=string, pointerType=null, optionsId=Ratings, unitId=null, isArray=false, sourceId=[Rating sourceId]

At 310, the creator assigns a value to the property for an object with identifier, [objectId]. This can take the form of:

Attestation: propertyId=[Rating propertyId], itemId=[objectId], value="AAA", creator=[Creator wallet], date=[now], expiration=null As noted above, the term "source", as used herein, can refer to a grouping of properties and data to facilitate decentralized data rights management. The disclosed implementation includes methods to create a decentralized ecosystem of data consumers and producers. One aspect of building this ecosystem is trust, that is the reliability and accountability of data sources. To build this trust, users must ensure that data pertaining to a property is posted by an authorized and qualified sources with full attribution.

With a wide range of data participation models expected, a range of control methods are required to cover expected patterns for data management. Some examples of control models that may be assigned to a source or a property that cover most authorization cases include:

Private—Property editable by trusted smart contracts.

Protected—creatorControlled. Property editable by source creator.

Protected—ownerControlled. Property editable by the current owner of the object in the Item Registry with an item Id as specified by the source assigned to the property. This is a frequently used control for properties assigned to NFTs. Since NFTs are transferrable and, as part of the NFT interface structure the owner at any time is known, this control pattern simplifies rights management for frequent ownership transfer between parties.

Protected—roleEnforced (RBAC). Property editable by evaluating if the caller is a member of the Owner or Editor group assigned to the property's source.

Protected—policyEnforced (ABAC). Property editable by consulting with a

Compliance Oracle to evaluate the right to edit based on configurable policies.

Protected—daoEnforced (DAO). Property editable by consulting with a Decentralized Autonomous Organization, via a vote, to evaluate make the requested data change. The mechanism to consult a DAO for the proposed state change is discussed in the U.S. patent publication 2021/0377045 A1

Public—Editable by any party

The Private control setting allows one smart contract mapped to the class to update properties for another smart contract mapped to the class if the properties are connected. This control model only allows data write requests from trusted smart contract sources, such as the Item Registry smart contract. To assign trust to a smart contract to enable updates to properties marked as private, the administrator of the AttestationRegistry smart contract can assign the trust relationship by calling the AttestationRegistry.AssignTrustedSource (smart contract address) method. Any write request to a property assigned the Private control model that does not originate from a trusted contract is rejected.

Protected control can be accomplished with a compliance oracle that can be implemented as a module and includes a smart contract, ComplianceOracle, that permits the creation and enforcement of complex policies (rulesets that are evaluated to determine if a proposed state change on the DLT is authorized). A rule exists in the form: Attribute, Comparison Operator, Attribute, Operator, Attribute [Operator and the final Attribute may be null]. An Attribute is a variable assigned an Attestation in the context of a transaction. An attribute may be a constant. Therefore, rules may be created: CreditScore GreaterThan 750 or MedicalPractitioner Equals True. Rules can be combined into rulesets which are evaluated as policy to enable an authorization decision by a policy enforcement point to allow (or disallow) a proposed state change. An example of the function of a compliance oracle is described in US patent publication 2019/0164151-A1.

The compliance oracle leverages policies, byte code representing the rules to be enforced published to an on-chain policy enforcement "oracle", that determine the authorization of a proposed state change, by interpreting the policy and the data that may be posted from external sources, including off-chain sources. The compliance oracle may be consulted as part of the trusted control mechanism to verify the authorization of a proposed request in the trusted control mechanism.

ComplianceOracle may reference data from smart contracts AttributeRegistry and AttestationRegistry. These smart contracts provide a smart contract based general purpose data management layer with flexible controls to enable a decentralized coalition of participants to: define data schema; share data; manage access and authority to create, update, and delete decentralized data; track provenance and data staleness; and mediate between differing formats for data consumption. These smart contracts allow the creation of arbitrary properties (attributes) that can be assigned to classes or object instance and populated with values based on authorized internal or external sources. AttributeRegistry (the terms "attributes" and "properties" are used interchangeably herein) allows robust and flexible control of data rights for objects and thus facilitates broad use of the framework. The AttestationRegistry records the values assigned to attributes for specific objects. For example, a class template may include a property for interest rate that is pegged to LIBOR. A specific entity is authorized to publish LIBOR data. A smart contract registered in logic registry 106 may depend on this value in its processing logic but does not want to (or need to) control the authority by which this value is set. The AttributeRegistry includes logic that enforces the right to publish this data. The class template links the property used by the smart contract to the corresponding attributes in the AttributeRegistry. As a new value is assigned in the AttestationRegistry, the smart contract logic has access to this value.

Creator controlled Sources can rely on a central authority to write data. This is the simplest control mechanism as the Source Creator maintains the right to add properties to the context and assign attestations for those properties. As mentioned above, the Creator may specify a Role Based Access Control (RBAC) model for control of context properties and data. If RBAC is selected, two default Properties are available for the source, Owner and Editor. The Creator may assign one or more wallets to the Owner or Editor role by entering a value in the Attestation Registry referencing the sourceId, propertyId (for Owner or Editor), and a value representing the wallet being granted the right. A party assigned the Editor right can create, update, or delete any attestation in the context for which they are the creator. A party assigned the Owner right can create, update, or delete any attestation in the context.

The Creator may also specify an Attribute Based Access Control (ABAC) model for control of context properties and data. If ABAC is selected, one default Property is available for the source, Policy. Policy defines a compliance oracle policy applied to determine if the party has edit rights. The compliance oracle is a flexible model to create complex policies that make authorization decisions based on attributes of the user and the affected objects. Operations of the compliance oracle are covered in more detail in U.S. Patent Publication 2019/0164151-A1.

The Creator may specify a Public control model for control of context properties and data. For this setting, any party with a wallet may edit context data.

On a public distributed ledger network, parties engaged in a wide range of activities require complex models for managing attestation authority from diverse sources. The power of these flexible data source control models to manage complex real world authority management models can be illustrated in the following example. For example, a system on a distributed ledger network used for medical payments may utilize the properties "PatientHealth" and "CreditScore" assigned to a wallet representing an individual. Attestations regarding each of these properties should be made by sources with very different qualifications. For an attestation regarding the property "PatientHealth" applied to an individual to have significance, it should be attested by a qualified medical practitioner, whereas the property "CreditScore" should be attested by a licensed financial institution. To maintain the integrity of attestations for a property, the source context managing each property will assign the right to attest through the control context as described above. But, it should be observed that the property qualified "MedicalPractitioner" is itself an attestation, perhaps made by a medical board. Membership on the medical board, "MedicalBoard" is a further attestation ultimately established by the root right, that is an attestor representing the authority of the medical board. This root is the authority who establishes the source control context by signing the transaction to create the source in the source registry to manage the right for all properties utilized in the scenario above. To accomplish a scalable ecosystem of medical attestations, a party might follow the sequence below.

A creator, assigned the authority to administer the medical attestation ecosystem adds a new entry to the SourceRegistry, a data structure representing a governance model for one or more properties as described above. The entry can be a data structure in the form of:

Source: name="MedicalBoard", creator=[Medical Board representative wallet], controlType=role, fee=null, itemId=null Using the authority as creator of the Source, the creator attests to the Editor status for members of the Boards assigning a role within the source the source to make attestations. For example, this role can be added in the form of the data structure below:

Attestation: propertyId=[Editor propertyId], itemId=[sourceId], [member walletId], value="true", creator=[Creator wallet], date=[now], expiration=null The creator may now create a property, MedicalPractitioner, that can be assigned to individual's wallets by members of the board. The entry can be a data structure in the form of:

Property: name=MedicalPractitioner, datatype=boolean, pointerType=null, optionsId=null, unitId=null, isArray=false, sourceId=[MedicalBoard sourceId]

Using the authority as an Editor as assigned by the creator in the RBAC control context of the source, a board member may attest to the status of a licensed medical practitioner in the form of the data structure below:

Attestation: propertyId=[MedicalPractitioner propertyId], itemId=[practitioner walletId], value="true", creator=[member walletId], date=[now], expiration=1 year The creator, may then create a new entry in SourceRegistry, a data structure representing a governance model for medical statement as described above. In this case the source is assigned a policy for making attestations to the MedicalStatements property, the policy being identified by policyId. A policy is a set of rules interpreted by a policy enforcement point in the context of a proposed state change to allow or disallow the change. Here, policyId refers to a simple policy requiring the party making the state change request to have an attestation MedicalPractitioner Equals True. The source entry for medical statement data can be a data structure in the form of:

Source: name="MedicalStatements", creator=[Medical Board representative wallet], controlType=policy, fee=null, itemId=[MedicalStatements policyId]

The creator may now create a property, Medical Practitioner, that can be assigned to individual's wallets by members of the board. The entry can be a data structure in the form of:

Property: name=PatientHealth, datatype=string, pointerType=null, optionsId=null, unitId=null, isArray=false, sourceId=[MedicalStatements sourceId]

Using the authority enforced by the assigned policy in the ABAC control context of the source (ex. MedicalPractitioner Equals True), a medical practitioner may attest to the status of a patient in the form of the data structure below:

Attestation: propertyId=[PatientHealth propertyId], itemId=[patient walletId], value="Good", creator=[practitioner walletId], date=[now], expiration=1 year The flexibility of the source control context allows a scalable system by which all statements and the source of their authority can be traced at ecosystem scale. The need for such system can be seen in the difficulty in certifying the degrees and credentials of parties within, let alone across, jurisdictions.

This problem is acute when sharing data across financial service providers. Attestations on simple properties like the price of an asset, its regulatory status, assigned ownership, the qualifications of investors, and more are notoriously difficult to reconcile. The disclosed implementation is designed to resolve this challenge by enabling a distributed ledger based ecosystem of trusted attestations with each element of data having full provenance.

Basic data types are supported for properties, e.g., Boolean, integer, decimal, string, and date/time. The system also supports advanced data types such as files (pointer to a file) and objects. The latter producing considerable flexibility in nested data mapping and polymorphism. For example, an authorized user may seek to add a property PostedCollateral, with a class template CollateralClass having an identifier collateralClassId. Attestations for this property assign objects of the CollateralClass to the associated object. The associated object smart contract may operate on the CollateralClass object by calling assigned functions and behaviors.

Figure 4:
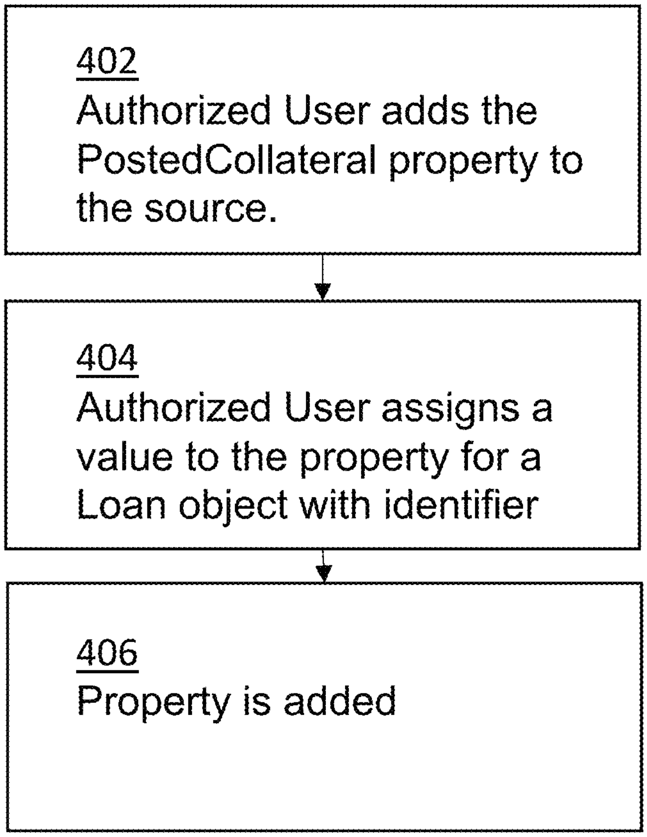
FIG. 4 is a flowchart of a process for assigning properties to a control source in accordance with disclosed embodiments.

FIG. 4 illustrates an example of a process for assigning a CollateralClass object with an identifier collateralId to a Loan with an identifier loanId. At 402 an Authorized User adds the PostedCollateral property to the source. This can be in the form of the data structure:

Property: name=PostedCollateral, datatype=object, pointerType=[collateralClassId], optionsId=null, unitId=null, isArray=false At 404, the Authorized User assigns a value to the property for a Loan object with identifier, [loanId]. This can be in the form of the data structure:

Attestation: propertyId=[PostedCollateralPropertyId], itemId=[loanId], value=[collateralId], creator=[user wallet], date=[now], expiration=null At 406, the assigned property is added to the AttestationRegistry.

This structure allows objects to reference other objects as properties. Since the property is strongly typed, that is has a defined type specified by the pointerType field, the behaviors (properties, functions, events, and errors) of the assigned object are known and can be references in smart contract code of the parent object with the request routed for processing using the methods for routing requests for strongly typed objects For example, the parent Loan object in the example above may call the Collateral.Forward function for the assigned collateral object if the loan's default condition is met. Another example, the Loan object may make a collateral call of the loan recipient if the Collateral. Price property is below the principal value of the loan. These calls may be further nested. If the loan is assigned to a property in a fund, the fund smart contract, may reference the collateral price Loan.Collateral.Price by referencing the object pointer of the Collateral property assigned to the object pointer of the Loan property.

When the value is set via the AttestationRegistry for a property with a datatype="object", the Attestation Registry smart contract code may initiate a request to the ItemRegistry.ImplementsClass smart contract function to validate the object typeId assigned to the object matches the pointerType. If the object referenced by the value that is proposed for the property does not implement the class assigned to the property's pointerType, the request to set data is rejected, throwing a TypeMismatch (objectId, pointerTypeId) error. The datatype "interface" follows the same method as "object". However, the ItemRegistry.ImplementsInterface smart contract function is called to ensure support for the assigned pointer type.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed:

1. A method executed by at least one computer processor executing instructions on a stored memory for creating a trusted data management model in a decentralized computing environment, the method comprising:

creating infrastructure, by the deployment of smart contracts to a distributed ledger, the infrastructure including a data structure for capturing, indexing, and storing attestation data corresponding to an attestation, wherein an attestation is a claim about an item or a linkage between items made by at least one authorized and accountable attesting user in a data context, wherein the data structure includes a multi-level key structure for indexing, wherein the multi-level key structure comprises a plurality of keys including a primary key, a secondary key, and a tertiary key;

creating and managing at least one source in a source registry smart contract, by an authorized data management user signing a first distributed ledger transaction, the at least one source specifying a control context for the management of data, wherein the source registry smart contract contains a table with at least one row, and wherein each of the at least one row represents one of the at least one sources, the data including the attestation data and at least one property which defines the attestation data, the control context defining a governance model to be applied to the corresponding data, whereby the authorized data management user can at least one of define, delegate, and/or decentralize rights to manage the data in the context, the rights being the ability for data consumption users to read or write data assigned to the control context using a distributed ledger public/private key;

creating the at least one property, the creation done by an authorized user within the control context signing a second distributed ledger transaction, each of said at least one property including one of the at least one sources, a name, a data type, and structure to thereby define associated attestation data, whereby the at least one property is operable to be linked to one or more classes of blockchain based objects, wherein the one or more classes of blockchain based objects is operable to be created from a plurality of class templates by a class registry smart contract, wherein a class template of the plurality of class templates maps at least one behavior of the one or more classes of blockchain based objects;

receiving the attestation, from an attestor who is one of the at least one authorized and accountable attesting users, the attestation being made by the attestor submitting the attestation data and signing a third distributed ledger transaction, the attestation data containing an attested value, wherein one or more of the at least one properties is operable to define the attested value, the attestation data pertaining to the item or the linkage between items, wherein the item is keyed by a unique identifier of an object corresponding to the item, the attestation data preserving an identity of the attestor, the attestation data containing a last update date and an expiration date, wherein the tertiary key of the multi-level key structure is operable to join three or more objects;

paying, by data consumers, an economic incentive to the attestor via a utility token, wherein the utility token is a blockchain based fungible token representing a fee charged to data consumers to receive access to the attestation data, wherein the fee is operable to be set at the source, property, and/or attestation assignment;

receiving, by the attestor, the fee paid by data consumers; and allowing consumption of the attestation data by a third party smart contract or an authorized consuming user signing a distributed ledger transaction;

wherein at least one source control model is one of a roles-based access control (RBAC) model, an attribute-based access control (ABAC) model, and a decentralized autonomous organization (DAO) model.

2. The method of claim 1, wherein the governance model includes a wallet address of the third party smart contract or the authorized consuming user, a control type, and the unique identifier (itemID) corresponding to the data to be controlled.

3. The method of claim 2, wherein each of the one or more of the at least one properties defines an element in the end-user controlled schema, the definition including property name, control context, and data type.

4. The method of claim 1, wherein the unit designation specifies a conversion of the data between unit measures, the conversion using smart contract code generated by developers and mapped to an original unit and a desired unit.

5. The method of claim 1, further comprising enabling multiple governance models to support a range of data control requirements expected through use including requirements to enable plural control scenarios, wherein a trusted smart contract writes data used by a second smart contract, creator-controlled schema and data, owner controlled schema and data for transferrable objects.

6. The method of claim 1, wherein the data type of each of the at least one properties includes objects with a defined pointer type, the pointer type defining pointer properties and methods of the object, enabling nested properties, that is a property whose assigned object has properties.

7. A computing system for creating a trusted data management model in a decentralized computing environment, the system comprising:

at least one computing processor; and at least one memory storing instructions that, when executed by the at least one computing processor, cause the at least one computing processor to carry on the method of:

creating infrastructure, by the deployment of smart contracts to a distributed ledger, the infrastructure including a data structure for capturing, indexing, and storing attestation data corresponding to an attestation, wherein an attestation is a claim about an item or a linkage between items made by at least one authorized and accountable attesting user in a data context, wherein the data structure includes a multi-level key structure for indexing, wherein the multi-level key structure comprises a plurality of keys including a primary key, a secondary key, and a tertiary key;

creating and managing at least one source in a source registry smart contract, by an authorized data management user signing a first distributed ledger transaction, the at least one source specifying a control context for the management of data, the data including the attestation data and at least one property which defines the attestation data, the control context defining a governance model to be applied to the corresponding data, whereby the authorized data management user can at least one of define, delegate, and/or decentralize rights to manage the data in the context, the rights being the ability for data consumption users to read or write data assigned to the control context using a distributed ledger public/private key;

creating the at least one property, the creation done by an authorized user within the control context signing a second distributed ledger transaction, each of said at least one property including one of the at least one sources, a name, a data type, and structure to thereby define associated attestation data, whereby the at least one property is operable to be linked to one or more classes of blockchain based objects, wherein the one or more classes of blockchain based objects is operable to be created from a plurality of class templates by a class registry smart contract, wherein a class template of the plurality of class templates maps at least one behavior of the one or more classes of blockchain based objects;

performing unit conversions using a unit conversion registry, wherein a unit registry code is generated by developers and mapped to an original unit and a desired unit, receiving the attestation, from an attestor who is one of the at least one authorized and accountable attesting users, the attestation being made by the attestor submitting the attestation data and signing a third distributed ledger transaction, the attestation data containing an attested value, wherein one or more of the at least one properties is operable to define the attested value, the attestation data pertaining to the item or the linkage between items, wherein the item is keyed by a unique identifier of an object corresponding to the item, the attestation data preserving an identity of the attestor, the attestation data containing a last update date and an expiration date, wherein the tertiary key of the multi-level key structure is operable to joint three or more objects;

paying, by data consumers, an economic incentive to the attestor via a utility token, wherein the utility token is a blockchain based fungible token representing a fee charged to data consumers to receive access to attestation data, wherein the fee is operable to be set at the source, property, and/or attestation assignment;

receiving, by the attestor, the fee paid by data consumers; and allowing consumption of the attestation data by a third party smart contract or an authorized consuming user signing a distributed ledger transaction;

wherein at least one source control model is one of a roles-based access control (RBAC) model, an attribute-based access control (ABAC) model, and a decentralized autonomous organization (DAO) model.

8. The system of claim 7, wherein the governance model includes a wallet address of the third party smart contract or the authorized consuming user, a control type, and the unique identifier (itemID) corresponding to the data to be controlled.

9. The system of claim 8, wherein each of the one or more of the at least one properties define an element in the end-user controlled schema, the definition including property name, control context, and data type.

10. The system of claim 7, wherein the method further comprises enabling multiple governance models to support a range of data control requirements expected through use including requirements to enable plural control scenarios, wherein a trusted smart contract writes data used by a second smart contract, creator-controlled schema and data, owner controlled schema and data for transferrable objects.

11. The system of claim 7, wherein the data type of each of the at least one properties includes objects with a defined pointer type, the pointer type defining pointer properties and methods of the object, enabling nested properties, that is a property whose assigned object has properties.

12. The method of claim 1, further comprising a compliance oracle facilitating execution of at least one smart contract, wherein the at least one smart contract permits creation and enforcement of policies and wherein the at least one smart contract provides for evaluation of the policies to determine if a proposed state change in the decentralized computing environment is authorized.

13. The method of claim 12, further comprising the compliance oracle referencing the at least one smart contract and providing a general-purpose data management layer including flexible controls to enable at least one user to define a data schema, share data, manage access and authority to create, update, and delete decentralized data, track provenance and data staleness, and/or mediate between differing formats for data consumption.

14. The method of claim 13, further comprising creating attributes based on the at least one smart contract and assigning the attributes to classes or objects and populating the attributes with values based on authorized internal or external sources.

15. The system of claim 7, further comprising a compliance oracle, wherein the compliance oracle facilitates execution of at least one smart contract, wherein the at least one smart contract permits creation and enforcement of policies and wherein the at least one smart contract provides for evaluation of the policies to determine if a proposed state change on the decentralized computing environment is authorized.

16. The system of claim 15, wherein the compliance oracle references the at least one smart contract to provide a general-purpose data management layer including flexible controls to enable at least one user to define a data schema, share data, manage access and authority to create, update, and delete decentralized data, track provenance and data staleness, and/or mediate between differing formats for data consumption.

17. The system of claim 16, wherein the at least one smart contract provides for creation of attributes, wherein the attributes are assigned to classes or objects and populated with values based on authorized internal or external sources.

* * * * *